UNITED STATES PATENT OFFICE.

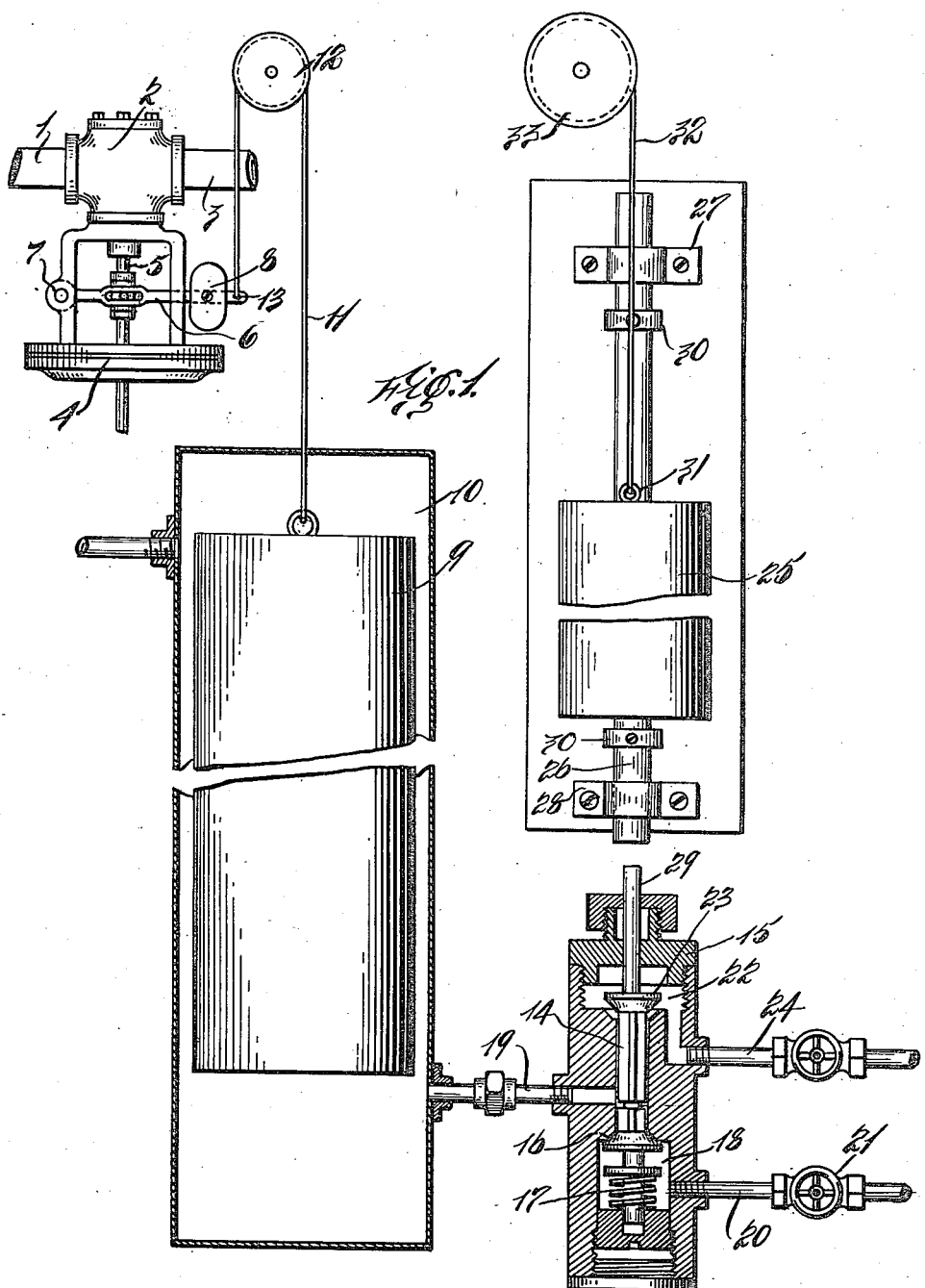

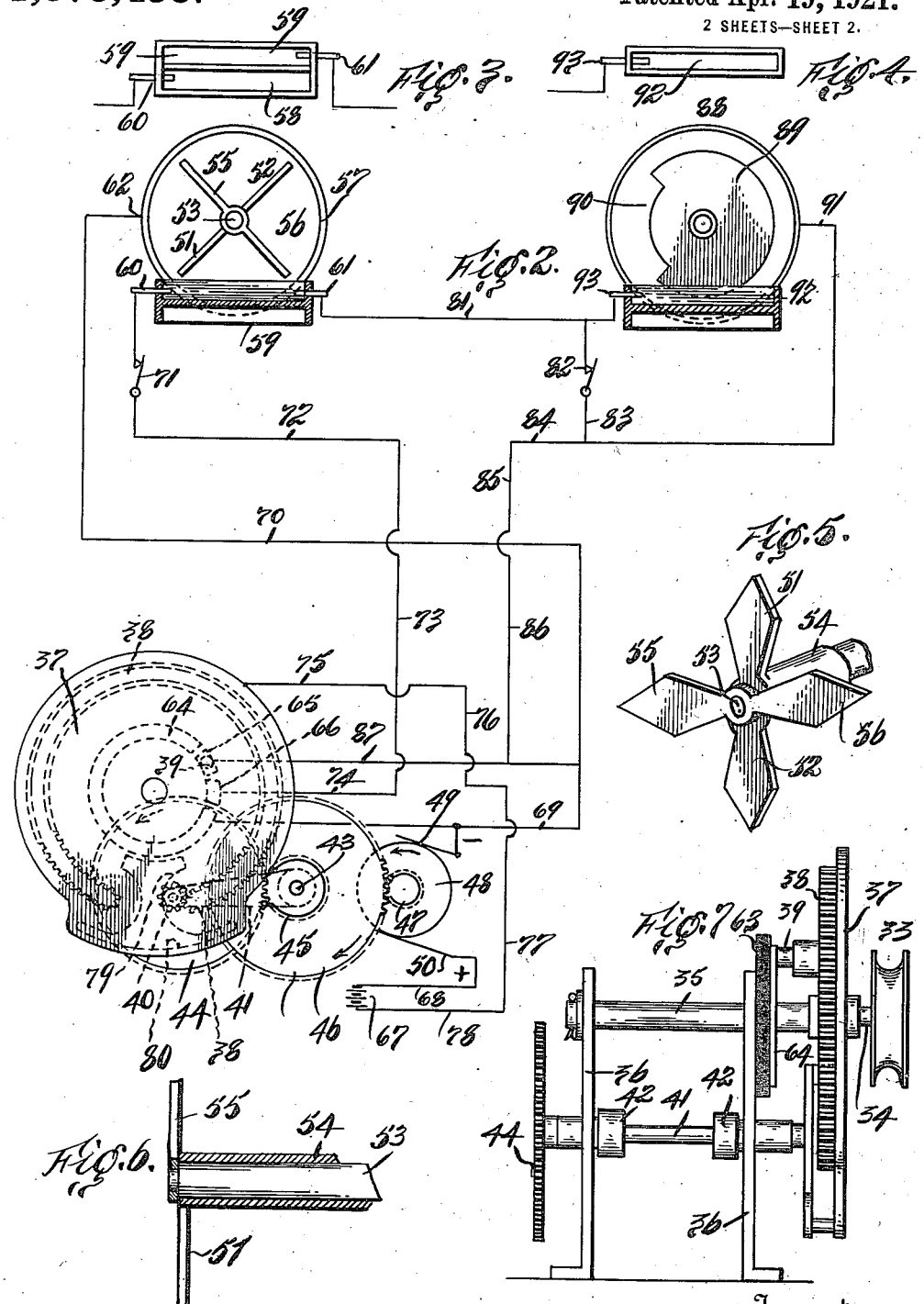

BENJAMIN POST HERMES, OF NEW YORK, N. Y.

HEAT-REGULATING SYSTEM.

1,375,458.  Specification of Letters Patent.  Patented Apr. 19, 1921.

Application filed April 28, 1920. Serial No. 377,256.

*To all whom it may concern:*

Be it known that I, BENJAMIN P. HERMES, a citizen of the United States, residing at New York city, New York, have invented certain new and useful Improvements in Heat-Regulating Systems, of which the following is a clear, full, and exact description.

This invention relates to an apparatus for controlling the heat supplied to buildings, and an object of the invention is to provide a system of heat regulation which results in a saving of fuel and which is susceptible of such control that heat is available practically at all times, while overheating is avoided.

In supplying steam heat to buildings, especially to apartment houses, it has been customary—where any attempt is made at all to introduce an automatic control—to provide a thermostat controlling a quick-acting valve. The thermostat in such a system is often placed in the entrance hall and set to open the valve to admit steam to the pipes leading to the house radiators when the temperature falls below a certain degree, as for instance 65° or 68° F., said valve closing when the temperature rises above 70°. If the outer doors are opened at such intervals that the temperature of the hall does not get above 70°, heat is constantly available at any radiator. If, however, the outer doors are closed for a considerable time, the temperature in the hall may reach 70° and no steam is available at any of the radiators, although it may be very much needed.

My improved system overcomes objections of this character, and also other objections inherent in thermostatic control systems, by using instead time controlled means for turning on and cutting off the heat supplied to the radiators, at frequent intervals, which intervals may be varied at will. In the case of steam heating systems to which my invention is shown applied, by way of concrete example, I prefer to control the valve in the main line so that it opens and closes slowly, and I have provided novel mechanism to accomplish this.

Further objects and advantages will become apparent from the following detailed description and claims, when considered in connection with the accompanying drawings, in which—

Figure 1 shows a portion of the mechanism comprising my improved heat regulating system;

Fig. 2 is a view, more or less diagrammatic, showing the time-controlling mechanism for the electric motor, which controls the valve motor shown in Fig. 1;

Fig. 3 is a plan view of a two-part mercury cup, whereby contacts are made to the motor;

Fig. 4 is a plan view of a mercury cup associated with the turning on and off of the electric time-controlling switch;

Fig. 5 is a perspective view of the adjustable contact arms for varying the times of actuation of the electric motor to control the opening and closing of the valve shown in Fig. 1;

Fig. 6 is a sectional view through the sleeves supporting the movable contact arms; and Fig. 7 is a side elevation of portions of the electric motor.

My improved heat regulating system is adapted for various forms of heat regulation, although in the particular embodiment of the invention I have shown the same in connection with a steam heating system.

In such systems, the steam used for heating purposes may be generated by a boiler on the premises, or it may be supplied from outside sources as is customary in large cities. In the present case, the source of heat supply is outside of the building to be heated, and in the drawings this source of supply is represented as a main supply pipe, indicated by the numeral 1. Since the steam thus supplied is often used for power as well as for heating, it is customary to supply it at a high pressure,—such for instance as 80 lbs. to the square inch. This, of course, is entirely too high for ordinary heating purposes, and for this reason it is usually customary to reduce this pressure before the steam is admitted to the piping of the building to be heated.

In the present case, I have shown at 2 a reducing valve of the ordinary type, so that steam entering through the pipe 1 at high pressure is reduced, and so that the pressure in the pipe 3 leading to the radiators of the building carries a pressure of only a few pounds. The operating mechanism for the reducing valve is indicated at 4, and consists of the usual diaphragms controlling the reducing valve, said valve having a stem 5, to which is connected a lever 6, pivoted at 7, and having a weight 8 adjustable on arm 6 to vary the pressure of the steam which may be admitted to the pipe 3. With the weight 8 in any particular position, steam would normally be admitted at a constant pressure to pipe 3. The parts above described are all old and well known.

My improvement consists in providing a means for controlling the complete closing of the valve 2 at suitable time intervals, and maintaining it closed for a definite time, which time may be varied to suit different conditions of temperature in accordance with the season and the heat requirements of the particular building being heated. After the valve has remained closed for the desired period of time, it is again automatically opened to the extent permitted by the reducing valve, so that my invention—which is in the nature of an attachment—does not in any way interfere with the usual reducing valve.

In localities where a temperature throughout the winter varies considerably from day to day and often during different parts of the same day, it is necessary to provide sufficient radiation to furnish adequate heat during the coldest weather, and consequently if the usual amount of steam is supplied to the radiators during warmer periods, the result will be an overheating of the building; and while individual tenants may turn off the steam at their radiators, it is quite usual to open the windows, resulting in waste of considerable heat.

My system of heat control purposes to do automatically what the tenant might do manually—that is to say, I provide an automatic control whereby the steam or other heat medium is completely cut off for a short interval of time; as, for example, for five minutes to even fifteen or twenty minutes, depending upon the outside temperature, and then turned on again for a longer or shorter period of time, depending also upon the outside temperature and upon the demands of the particular building for heat. In the case of steam, which is the heating medium usually employed, it results that the steam in the radiators may be completely condensed during the time the heat is cut off; and due to the large quantity of latent heat, which is converted into sensible heat during condensation, the temperature of the radiator may remain unaltered at substantially 212°. Under some conditions of weather it may be desirable to have the supply of steam cut off only for sufficient time for complete condensation to occur at the radiators; but under different conditions of temperature, entirely satisfactory heating may also be obtained by cutting off the steam for a longer period, allowing the radiators to cool somewhat. The system, however, is extremely flexible, thereby adapting it for any condition of temperature which may prevail at the time.

With the above explanation, it will now be readily understood that a broad aspect of my invention contemplates the automatic control of heat, and more particularly of the valve 2 which admits the heating element, and which in the particular embodiment is steam, such control acting to cut it off or turn on the supply of heat at frequent time intervals, which intervals may be varied and which intervals are of such duration that the temperature of the rooms or the space to be heated remains substantially constant.

In the preferred embodiment of my invention, the valve 2 is controlled by a fluid motor consisting of a weight 9 suspended in a chamber 10 by a flexible member 11 passing over a pulley 12, and connected at 13 to the lever 6. The weight 9 is preferably so constructed and is of such specific gravity that it will float in water. It is also sufficiently heavy, so that if no water is present in the chamber 10 the weight will sink and lift the lever 6 to close the valve against the action of the weight 8, normally tending to open the valve. To permit the valve to open under action of weight 8, it is obvious that the weight 9 must be lifted, and this is accomplished by the admission of fluid—preferably water—to the chamber 10 under control of a governor, which governor consists of a valve 14 movable in a casing 15. The valve 14 is provided with a seat 16, which is normally forced by a spring 17 to close the connection from the chamber 18 to the conduit 19, which conduit connects the valve chamber 18 with the weight chamber 10; and also connected with the chamber 18 is a pipe 20 leading to a source of fluid supply—as, for instance, the usual water main. This pipe may be valve-controlled at 21. The casing 15 is also provided with a chamber 22, and the valve 14 is provided with an upper portion 23 which controls communication between the chamber 22 and the conduit 19.

With the parts in the position shown in Fig. 1, any water in the chamber 10 above the conduit 19 will flow through said conduit and into the chamber 22, which may be provided with a waste pipe 24, through which the water may be conducted to a sewer. Under these conditions, the weight 9 occupies such a position that the valve 2 is tightly closed, so that no steam is admitted to the pipe 3.

In order to open the valve, I provide means, under control of the timing mechanism, which will be described later, for forcing down the valve 14 so as to connect the chamber 18 with the conduit 19. Under these conditions, water will flow through the pipe 20 into the chamber 18 around the valve 14, and into the conduit 19 to the chamber 10. The weight 9 will rise, permitting the weight 8 to act to cause the valve to open and to admit the steam to the pipe 3. Owing to the fact that steam enters the pipe at considerable pressure, it requires considerable force to close the valve 2, and therefore a motor in the form of a fluid-controlling weight 9 is preferable to other forms of valve-controlling means. This form of control permits a slow opening and closing of the valve, so that hammering in the pipes is avoided.

The mechanism for directly acting on the valve 14 consists of a weight 25 having a stem 26, suitably guided in brackets 27 and 28, said stem engaging the stem 29 of the valve 14 when the weight 25 is allowed to descend. The stem 26 of the weight carries limiting stops 30, which abut against the brackets 27 and 28, and the weight 25 is sufficiently heavy to overcome the action of the spring 17. Connected to the weight 25, at 31, is a flexible member 32 which passes over a pulley 33, which pulley is connected to a shaft of a motor, whose operation is electrically controlled by a time switch. This may be of any suitable construction, and for the purposes of this application I have shown a conventional form, although it is obvious that a different form of motor may be substituted without in any manner departing from the spirit of my invention.

Referring to Fig. 7, the pulley 33 is mounted on a shaft 34, passing through a sleeve 35, suitably supported by standards 36. Rigid with the shaft 34 is a disk 37, which carries on its inside a double-faced rack 38. The disk 37 also carries an electrically-conducting contact pin 39 for controlling electrical connections for the motor, which connections will be later described more in detail.

Referring to Fig. 2, the rack 37 is engaged by a pinion 40 mounted upon a floating fulcrum 41, carried by arms 42, supported on a shaft 43. The floating shaft 41 also carries a cog wheel 44, which meshes with a pinion 45 rigid with the shaft 43. Also rigid with said shaft 43 is another cog wheel 46, which engages the pinion 47 on the armature shaft of the motor. The armature 48 is provided with a commutator ring upon which bear the brushes 49 and 50. In order to control the time interval during which the motor may operate and to control the turning on and off of the steam at the valve 2, there is provided a timing switch, which is diagrammatically shown in Fig. 2, said switch including contact arms 55 and 56 mounted upon a shaft 53, which shaft is driven by any suitable train of gears so that it makes one rotation in an hour. Any suitable clock-work mechanism may be employed for thus driving the shaft 53. On this shaft is a sleeve 54, carrying contact arms 51 and 52. These contact arms rotate in front of a dial shown diagrammatically at 57, which may be graduated to indicate suitable time intervals. The sleeve 54 is frictionally driven from the shaft 53, and therefore the arms 51 and 52 may be adjusted relatively to the arms 55 and 56. These arms are adapted, when they reach approximately a vertical position, to dip into mercury cups, the arms 51 and 52 being in the same plane and dipping into mercury cup 59, Fig. 3; the arms 54 and 55, when in approximately vertical position, dipping into mercury cup 58. Electric leads enter the mercury cups 58 and 59 at 60 and 61 respectively. An electric lead also engages the casing of the timing mechanism, as at 62, and is in electrical contact with both of the pairs of contact arms.

Referring to Fig. 7, there is provided an insulated disk 63, supported by the right hand standard 36; and to the right of this disk is a contact sector 64 extending through the larger portion of a circumference, as shown most clearly in Fig. 2. Also, supported by the insulated disk 63 is an electrically-conducting member 65; and adjacent thereto a second electrically-conducting member 66, which member is normally out of electrical contact with the members 65 and 64. The contact pin 39, carried by the disk 37, is adapted to bridge the gap between the contacts 64 and 65 and 64 and 66, as will be explained in connection with the circuits. Electric energy is supplied by a battery or other suitable source, indicated at 67.

In Fig. 2, the contact arm 51 is shown as approaching the mercury cup, and when it dips into it an electric circuit is completed as follows:

From the battery 67, through wire 68 to brush 50, through the armature to brush 49, wires 69 and 70 to 62, through arm 51, mercury cup 59, lead 61, wire 81, switch 82 which is closed, wires 83, 84, 85, 86, 87 to contact 65, and pin 39 which is in electrical contact with disk 37. Wire 75 may be connected to the disk 37 through the framework of the motor, the current then flowing from the pin 39 to wire 75, and through wires 76, 77 and 78 to the battery 67. The motor then starts to move in the direction of the arrow shown on the motor armature 48, and through the train of gears starts to rotate the pinion 40 in an anti-clockwise direction. The pinion is provided with a collar adjacent thereto, which engages the edge 79 of a cam 80, so that said pinion rolls around the end of the cog track 38 and engages the outer cogged surface thereof. This results in a clockwise rotation of the disk 37, carrying the pin 39 from off the contact 66 and into contact with the sector 64, thus maintaining the electric circuit through the motor, which continues to run until the disk 37 has been rotated such a distance that the pinion 40 engages the other end of the cog track 38. At this time the pin 39 passes from the sector 34 on to the electric contact 65, and the circuit through the motor is thereby broken. At the same time the collar of the pinion 40 comes into contact with the opposite surface of the cam 80 and prevents momentum of the disk 37 from carrying it farther. Rotation of the motor in the direction just described will result in clockwise rotation of the pulley 33, and a consequent lowering of the weight 25, which acts on the valve 14 to open the same, and permits water to enter the chamber 10 to raise the weight 9 and permits the valve 2 to be opened. Steam will then flow into the pipe 3 and to the radiators connected thereto; and such flow will continue, not only during the time that the contact arm 51 remains in contact with the mercury in the cup 59, but until another contact is made by the arm 55 dipping into the mercury in the cup 58. When this happens, current will flow through the battery 67 to wire 68, brush 50, brush 49, wires 69 and 70, contact 62, contact arm 55, mercury cup 58, electric lead 60, wires 72, 73, 74 to contact 66. It will be remembered that the contact pin 39 is now in contact with 66. Current therefore flows through said pin to the disk 37 to wires 75, 76, 77, 78, and back to battery. The motor will then begin to rotate in the same direction as before; but by reason of the fact that the pinion 40 rides up over the end of the cog track 38 and onto the inner cogged surface of said track, the disk 37 will rotate in a contra-clockwise direction, and the pin 39 will move from the contact 65 onto the conducting segment 64. This movement will continue until contact pin moves off from the segment 64 to the contact 66, when the parts will again be in the position shown in Fig. 2. Contra-clockwise rotation of the disk 37 will result in winding up flexible member 32, raising the weight 25 so that the valve 14 will be raised by the spring 17, permitting the fluid in the chamber 10 to flow through the conduit 19, chamber 22 and waste outlet 24. The descent of the weight 9 will close the valve 2 to cut off the steam.

The switch 71 may be used to cut out the time-controlling mechanism at any time desired. When this switch is closed, current passes as already described; but when the switch is opened, the contact of the arms 55 and 56, controlling the cutting off of the valve 2, will not cause operation of the electric motor, and the steam will remain on indefinitely.

It is customary during the night to cut off the steam entirely, and let it remain off until early morning. This may be accomplished manually by breaking the circuit through the motor at any convenient place by a hand-operated switch after the timing mechanism has operated to shut off the valve 2. However, in order to make the entire system automatic, I have provided a second time-controlling mechanism 88 for cutting off the current from the timing mechanism already described. Said second timing mechanism, consists of a disk 89, having a cutaway portion 90. This disk 89 is of electrically-conducting material and is grounded through the clock frame to the wire 91, which connects with wire 84. The disk 89 makes electrical contact with a mercury cup 92, from which passes a lead 93 connected to the wire 81. When this second timing mechanism is used, the switch 82 is normally opened; and during that portion of the day when it is desired to have the control by the first timing mechanism, in operation the conducting portion of the disk 89 makes contact with the mercury cup 92, so that current flowing through the contact arms 51 or 52 will pass through the wire 81 to lead 93, mercury cup 92, disk 89, wire 90 and wire 84. The disk 89 is driven by clock work, and makes one rotation in twenty-four hours. The cutaway portion 90 may be of any size, and in fact a number of disks 89 may be provided having cutaway portions 90 of different lengths, said cutaway portion acting to break the current through the mercury cup and therefore render inoperative the control of the motor by the on-contact arms 51 and 52. It will be apparent that after the contact is broken at the disk 89, the contact arm 55 or 56 will subsequently act to cause operation of the motor to cause the valve 2 to be closed; but due to the fact that the contact is broken at the disk 89, the on-contact arm 51 or 52 will not again cause the valve to open. However, after a period of time of longer or shorter duration—depending upon the length of the cutaway portion 90—the disk 89 will again make contact with the mercury cup 92, and subsequently the closing of the contact through either arm 51 or 52 will cause the valve 2 to be opened. The disk 90 is mounted on a sleeve which frictionally engages a driving shaft so that said disk may be adjusted to cause a circuit through the timing mechanism 88 to be interrupted at any time desired during the twenty-four hours.

While 1 have shown two pairs of arms 51—52 and 55—56, it is obvious that more than two pairs may be provided if desired. It is also obvious that a single arm could take the place of each pair of arms.

While I have shown and described a preferred embodiment of my invention, it is obvious that variations may be resorted to within the spirit thereof, and parts of the improvement may be used without others.

Having thus described my invention, what I claim and desire to secure by Letters Patent is:

1. In a heat regulating system, in combination, time controlled means for turning on and cutting off a source of heat supply at independent and variable time intervals of such duration that the temperature of the space being heated is substantially constant.

2. In a heat regulating system for steam heating, in combination, time controlled means for turning on and cutting off a source of heat supply at independent and variable time intervals, the off interval being for a period sufficient to allow for substantially complete condensation of the steam at the point of radiation.

3. In a heat regulating system for steam heating, in combination, time controlled means for turning on and cutting off a source of heat supply at time intervals, the off interval being for a period sufficient to allow for substantially complete condensation of the steam at the point of radiation and the on interval being independently variable at will.

4. In a heat regulating system for steam heating, in combination, time controlled means for turning on and cutting off a source of heat supply at time intervals with provisions whereby the off interval and the on interval may be independently varied at will.

5. In a heat regulating system, in combination, a valve controlling a source of heat supply, time controlled means and connections therefrom to said valve to slowly open the same and maintain it open for a variable, but predetermined interval and for closing said valve and maintaining it closed for a variable but predetermined interval, said time intervals being independent of each other.

6. In a heat regulating system, in combination, a valve controlling a source of heat supply, a motor connected to said valve to control its opening and closing, a governor to control the supply of power to said motor, a second motor, means controlled by said second motor to actuate said governor, and time-controlled means for determining when said second motor shall operate.

7. In a heat regulating system, in combination, a valve for controlling a source of heat supply, a fluid motor for said valve to control its slow opening and closing, and time controlled means for variably determining when said motor shall operate.

8. In a heat regulating system, in combination, a valve controlling a source of heat supply, a motor for actuating said valve comprising a weight connected to normally close the valve, means tending to open the valve, a chamber in which said weight moves, a governor for controlling the supply of fluid admitted to said chamber, said governor comprising a casing and a valve therein, a conduit connecting said casing and said weight chamber, inlet and outlet fluid conducting pipes leading into said casing, said valve movable to cause connection to be made from either the inlet or the outlet pipe to said conduit.

9. In a heat regulating system, in combination, a valve for controlling a source of heat supply, a motor for actuating said valve comprising a weight connected to normally close the valve, means tending to open the valve, a chamber in which the weight moves, means for admitting fluid pressure to said chamber, a governor for controlling the supply of said fluid pressure, said governor comprising a casing, a stemmed valve therein, a conduit from said casing to said weight chamber, inlet and outlet fluid-conducting pipes leading into said casing, a spring normally holding said valve in position to connect the outlet pipe to said conduit, a weight suspended above said valve stem, said weight when lowered acting to compress said valve spring and close the connection between the outlet pipe and said conduit and open the connection between the inlet pipe and said conduit, a motor controlling said last-mentioned weight, and time controlling means for determining when said motor shall operate.

10. In a heat regulating system, in combination, a valve for controlling a source of heat supply, a motor for actuating said valve comprising a weight connected to normally close the valve, means tending to open the valve, a chamber in which the weight moves, means for admitting fluid pressure to said chamber, a governor for controlling the supply of said fluid pressure, said governor comprising a casing, a stemmed valve therein, a conduit from said casing to said weight chamber, inlet and outlet fluid-conducting pipes leading into said casing, a spring normally holding said valve in position to connect the outlet pipe to said conduit, a weight suspended above said valve stem, said weight when lowered acting to compress said valve spring and close the connection between the outlet pipe and said conduit and open the connection between the inlet pipe and said conduit, an electric motor controlling said last-mentioned weight, and time controlling means for determining when said motor shall operate, said time-controlling means comprising adjustable contact devices for varying at will the times of operation of said electric motor.

11. In a heat regulating system, in combination, timing mechanism for controlling the turning on and cutting off of a source of heat supply, said timing mechanism comprising arms rotating once in an hour, means under control of said arms for turning said heat on and off, and means for automatically rendering said timing mechanism ineffective during selected times.

12. In a heat regulating system, in combination, timing mechanism for controlling the turning on and cutting off of a source of heat supply, said timing mechanism comprising arms rotating once in an hour, means under control of said arms for turning said heat on and off, and a second timing mechanism comprising a twenty-four hour moving disk and means controlled by said disk for automatically rendering said first-mentioned timing mechanism ineffective during selected times.

13. In a heat regulating system, in combination, an electric motor, means controlled thereby for turning on and cutting off a source of heat supply, a timing mechanism and means controlled by said timing mechanism for determining when said motor shall operate.

14. In a heat regulating system, in combination, with a source of heat supply, of an electric motor, means controlled thereby for turning on and cutting off a source of heat supply, a timing mechanism, said timing mechanism comprising on and off contact arms for closing a circuit through said motor to determine when said motor shall operate.

15. In a heat regulating system, in combination, a valve controlling a source of heat supply, a motor connected to said valve to control its opening and closing, a governor, said governor including a valve for controlling the supply of power to said motor, and a second motor including a weight adapted to act on said governor valve.

16. In a heat regulating system, in combination, a valve controlling a source of heat supply, a motor connected to said valve to control its opening and closing, a governor, said governor including a valve to control the supply of power to said motor, a second motor including a weight adapted to act on said governor valve, and time controlled means for determining when said weight shall become effective on said governor valve.

Signed at New York city, N. Y., this 27th day of April, 1920.

BENJAMIN POST HERMES.